United States Patent
Wu et al.

(10) Patent No.: US 12,041,013 B2
(45) Date of Patent: Jul. 16, 2024

(54) CHANNEL INFORMATION REPORTING FOR DORMANT BANDWIDTH PART

(71) Applicant: Nokia Technologies Oy, Espoo (FI)

(72) Inventors: Chunli Wu, Beijing (CN); Jarkko Koskela, Oulu (FI); Samuli Turtinen, Ii (FI); Tero Henttonen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 284 days.

(21) Appl. No.: 17/318,181

(22) Filed: May 12, 2021

(65) Prior Publication Data

US 2021/0367744 A1 Nov. 25, 2021

(30) Foreign Application Priority Data

May 21, 2020 (WO) ................ PCT/CN2020/091635

(51) Int. Cl.
*H04L 5/00* (2006.01)
*H04B 7/06* (2006.01)
*H04L 25/02* (2006.01)

(52) U.S. Cl.
CPC ......... *H04L 5/0098* (2013.01); *H04B 7/0626* (2013.01); *H04L 5/0051* (2013.01); *H04L 5/0092* (2013.01); *H04L 25/0226* (2013.01)

(58) Field of Classification Search
None
See application file for complete search history.

(56) References Cited

U.S. PATENT DOCUMENTS

| | | | | |
|---|---|---|---|---|
| 11,582,014 | B2* | 2/2023 | Tsai | H04W 72/0453 |
| 11,582,015 | B2* | 2/2023 | Hsieh | H04L 1/1819 |
| 2019/0149305 | A1* | 5/2019 | Zhou | H04L 5/0092 370/330 |
| 2019/0207737 | A1* | 7/2019 | Babaei | H04L 5/0098 |

(Continued)

FOREIGN PATENT DOCUMENTS

| | | |
|---|---|---|
| CN | 109413691 A | 3/2019 |
| CN | 110022197 A | 7/2019 |

(Continued)

OTHER PUBLICATIONS

ETSI, Medium Access Control (MAC) protocol specification (3GPP TX 38.321 version 15.4.0 Release 15) (Year: 2019), pp. 48-50.*

(Continued)

*Primary Examiner* — Otis L Thompson, Jr.
(74) *Attorney, Agent, or Firm* — Harrington & Smith

(57) ABSTRACT

Example embodiments of the present disclosure relate to channel information transmitting for dormant bandwidth part. According to embodiments, a solution for channel information transmitting for dormant bandwidth part has been proposed. A terminal device is configured a periodicity when an active downlink (DL) bandwidth part (BWP) is a dormant BWP. The periodicity is different from a further periodicity which is configured and used when the active DL BWP is a non-dormant BWP. The terminal device uses resourced configured for the active uplink (UL) BWP but with the different periodicity. In this way, it allows sounding reference signal (SRS)/channel state information (CSI) reporting without duplicating configurations of BWPs. It can configure a required longer periodicity but reduce the SRS configuration for each UL BWP.

22 Claims, 7 Drawing Sheets

(56) References Cited

U.S. PATENT DOCUMENTS

| | | |
|---|---|---|
| 2019/0296805 A1* | 9/2019 | Son ................. H04W 76/27 |
| 2019/0306739 A1 | 10/2019 | Kim et al. |
| 2020/0145164 A1 | 5/2020 | Cheng ........................ 5/53 |
| 2020/0229081 A1* | 7/2020 | Ang ................. H04W 52/0206 |
| 2020/0244410 A1* | 7/2020 | Kim ................. H04W 72/542 |
| 2021/0028843 A1* | 1/2021 | Zhou ................. H04B 7/063 |
| 2021/0143970 A1* | 5/2021 | Xu ................. H04L 5/0055 |
| 2021/0185614 A1* | 6/2021 | Zhou ................. H04L 5/0051 |
| 2021/0376985 A1* | 12/2021 | Zhou ................. H04L 5/0053 |
| 2021/0377852 A1* | 12/2021 | Zhou ................. H04W 52/0206 |
| 2022/0116923 A1* | 4/2022 | Kim ................. H04L 5/0098 |
| 2022/0225140 A1* | 7/2022 | Seo ................. H04W 72/542 |
| 2022/0264461 A1* | 8/2022 | Chen ................. H04W 52/0232 |
| 2022/0394682 A1* | 12/2022 | Nory ................. H04W 72/0453 |
| 2022/0399982 A1* | 12/2022 | Nory ................. H04W 72/044 |

FOREIGN PATENT DOCUMENTS

| | | |
|---|---|---|
| CN | 110167167 A | 8/2019 |
| CN | 110445565 A | 11/2019 |
| CN | 110635874 A | 12/2019 |
| CN | 110891291 A | 3/2020 |
| WO | WO-2020/047080 A1 | 3/2020 |
| WO | WO-2020/066852 A1 | 4/2020 |
| WO | WO-2020/084879 A1 | 9/2021 |

OTHER PUBLICATIONS

"UE Adaptation to the Traffic and UE Power Consumption Characteristics", Qualcomm Incorporated, 3GPP TSG RAN WG1 Ad-Hoc Meeting 1901, R1-1900911, Jan. 2019, 24 pages.

"Other Remaining Issues for Rel-16 Power saving", Huawei, HiSilicon, 3GPP TSG RAN WG1 Meeting #100bis-e, R1-2002577, Apr. 2020, 6 pages.

"Remaining issue on Scell dormancy indication" Huawei, HiSilicon, 3GPP TSG RAN WG1 Meeting #101-e, R1-2003507, Jun. 2020, 6 pages.

"Discussion on Scell dormancy", Huawei, HiSilicon, 3GPP TSG RAN WG4 Meeting #94bis-e, R4-2004355, Apr. 2020, 4 pages.

* cited by examiner

| 3010 | 3020 | 3030 |
|---|---|---|

| 3040-1 | 3040-2 | 3050 | 3060 | 3070 |
|---|---|---|---|---|

| 3080-1 | 3090-1 |
|---|---|

. . .

| 3080-M | 3090-M |
|---|---|

| 3040-3 | 3092-1 | 3094-2 |
|---|---|---|

. . .

| 3040-P | 3092-M | 3094-M |
|---|---|---|

Fig. 3

CHANNEL INFORMATION REPORTING FOR DORMANT BANDWIDTH PART

FIELD

Embodiments of the present disclosure generally relate to the field of telecommunication and in particular, to methods, devices, apparatuses and computer readable storage medium for channel information reporting for dormant bandwidth part.

BACKGROUND

With development of communication systems, more and more technologies have been proposed. For example, the technology named "bandwidth part (BWP)" has be introduced. BWP is a contiguous set of physical resource blocks, selected from a contiguous subset of common resource blocks for a given numerology on a given carrier. A plurality of BWPs can be configured for uplink and downlink between a terminal device and a network device. The BWP configured for the uplink and the BWP configured for the downlink can be selected independently. Generally, only one BWP can be active at each specific moment.

SUMMARY

In general, example embodiments of the present disclosure provide a solution for channel information reporting for dormant bandwidth part.

In a first aspect, there is provided a first device. The first deice comprises at least one processor; and at least one memory including computer program codes; the at least one memory and the computer program codes are configured to, with the at least one processor, cause the first device to receive, from a second device, a configuration for transmitting channel information, the configuration indicating a periodicity for transmitting the channel information when an active downlink bandwidth part (BWP) for a serving cell is a dormant bandwidth part. The first device is also caused to determine whether the active downlink BWP for the serving cell is the dormant bandwidth part. The first device is further caused to in accordance with a determination that the active downlink BWP is the dormant bandwidth part, transmit the channel information to the second device with the periodicity.

In a second aspect, there is provided a second device. The second device comprises at least one processor; and at least one memory including computer program codes; the at least one memory and the computer program codes are configured to, with the at least one processor, cause the second device to transmit to a first device a configuration for transmitting channel information, the configuration indicating a periodicity for transmitting the channel information when an active downlink bandwidth part (BWP) for a serving cell is a dormant bandwidth part. The second device is further caused to determine the active downlink BWP for the serving cell is the dormant bandwidth part. The second device is also caused to receive the channel information to the second device with the periodicity.

In a third aspect, there is provided a method. The method comprises receiving, at a first device and from a second device, a configuration for transmitting channel information, the configuration indicating a periodicity for transmitting the channel information when an active downlink bandwidth part (BWP) for a serving cell is a dormant bandwidth part. The method also comprises determining whether the active downlink BWP for the serving cell is the dormant bandwidth part. The method further comprises in accordance with a determination that the active downlink BWP is the dormant bandwidth part, transmitting the channel information to the second device with the periodicity.

In a fourth aspect, there is provided a method. The method comprises transmitting, at a second device and to a first device, a configuration for transmitting channel information, the configuration indicating a periodicity for transmitting the channel information when an active downlink bandwidth part (BWP) for a serving cell is a dormant bandwidth part. The method also comprises determining the active downlink BWP for the serving cell is the dormant bandwidth part. The method further comprises receiving the channel information to the second device with the periodicity.

In a fifth aspect, there is provided an apparatus. The apparatus comprises means for receiving, at a first device and from a second device, a configuration for transmitting channel information, the configuration indicating a periodicity for transmitting the channel information when an active downlink bandwidth part (BWP) for a serving cell is a dormant bandwidth part; means for determining whether the active downlink BWP for the serving cell is the dormant bandwidth part; and means for in accordance with a determination that the active downlink BWP is the dormant bandwidth part, transmitting the channel information to the second device with the periodicity.

In a sixth aspect, there is provided an apparatus. The apparatus comprises means for transmitting, at a second device and to a first device, a configuration for transmitting channel information, the configuration indicating a periodicity for transmitting the channel information when an active downlink bandwidth part (BWP) for a serving cell is a dormant bandwidth part; means for determining the active downlink BWP for the serving cell is the dormant bandwidth part; and means for receiving the channel information to the second device with the periodicity.

In a seventh aspect, there is provided a computer readable medium. The computer readable medium comprises program instructions for causing an apparatus to perform at least the method according to any one of the above third and fourth aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIG. 3 illustrates a schematic diagram of a medium access control (MAC) control element (CE) according to some example embodiments of the present disclosure;

Throughout the drawings, the same or similar reference numerals represent the same or similar element.

DETAILED DESCRIPTION

Figure 1:
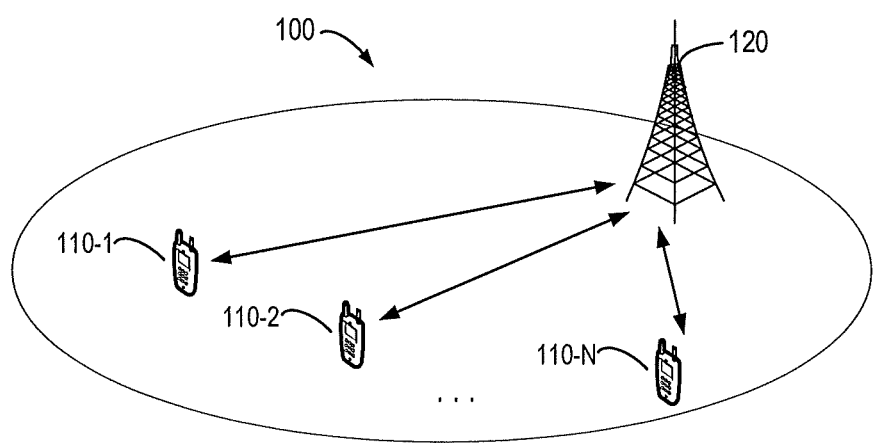
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, an Integrated and Access Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As mentioned above, the BWP has been introduced. A plurality of BWPs can be configured for uplink and downlink, respectively. Even though multiple BWPs can be defined in downlink and uplink, only one BWP can be active at each specific moment. For downlink, the terminal device can be configured with up to four BWPs. The bandwidth of each BWP may be equal or greater than a bandwidth of synchronization signal (SS) block, but it may or may not contain SS block. Only one BWP can be active at a given time. The terminal device may be not expected to receive physical downlink shared channel (PDSCH), physical downlink control channel (PDCCH), a channel state information-reference signal (CSI-RS), or a tracking reference signal (TRS) outside the BWP.

For uplink, the terminal device can be configured with up to four BWPs. Only one BWP can be active at a given time. If the terminal device is configured with a supplementary uplink, the terminal device can in addition be configured with up to one or more BWPs in the supplementary uplink. The UE may not transmit physical uplink shared channel (PUSCH) or physical uplink control channel (PUCCH) outside the active BWP.

Moreover, a dormant secondary cell (SCell) state has been introduced. If the terminal device is in the dormant SCell state, there is no PDCCH monitoring or uplink transmission. Only periodic channel state information can be reported via a primary cell (PCell). Similarly, a dormant BWP has also been introduced. In particular, if a BWP is activated and it is the dormant BWP, the bwp-InactivityTimer of this Serving Cell may be stopped. The terminal device may not monitor the PDCCH on the BWP and not monitor the PDCCH for the BWP. The downlink-shared channel (DL-SCH) on the BWP may not be received. The terminal device may perform CSI measurement for the BWP, if configured. The sounding reference signal (SRS) may not be transmitted on the BWP. The uplink-shared channel (UL-SCH) on the BWP may also not be transmitted on the BWP. The network device may not transmit physical uplink control channel (PUCCH) on the BWP. Any configured downlink assignment and any configured uplink grant Type 2 associated with the SCell may be clear, respectively. Any configured uplink grant Type 1 associated with the SCell may be suspended.

There is an assumption of no periodic SRS transmissions for a serving cell when the UE is on a dormant DL BWP (with potentially also A-CSI, but this was not clear yet) for the serving cell. The issue needs to be resolved. Thus, there is a problem how to enable SRS transmission on dormant BWP without needing to configure rather huge SRS-config for each UL BWP. The following agreements have been made with the assumption of no UL transmission for a serving cell when the DL is on a dormant BWP for the serving cell. In particular, no uplink dormant BWP is defined. The terminal device does not switch uplink BWP as a result of transition from dormancy to non-dormancy for DL BWP. The activated SCell on which the active BWP is dormant BWP should not be included in a power headroom (PHR) report. Thus, no discussion about how UL transmission/PHR works.

According to embodiments, a solution for channel information reporting for a serving cell with dormant bandwidth part has been proposed. A terminal device is configured a periodicity when an active DL BWP for a serving cell is a dormant BWP. The periodicity is different from a further periodicity which is configured and used when the active DL BWP is a non-dormant BWP. The terminal device uses resourced configured for the active UL BWP but with the different periodicity. In this way, it allows SRS/CSI reporting without duplicating configurations of BWPs. It can configure a longer periodicity but reduce/avoid duplicating the SRS configuration for each UL BWP.

FIG. 1 illustrates a schematic diagram of a communication environment 100 in which embodiments of the present disclosure can be implemented. The communication environment 100, which is a part of a communication network, comprises a device 110-1, a device 110-2, . . . , a device 110-N, which can be collectively referred to as "first device(s) 110." The communication environment 100 further comprises a second device 120 that can communicate with the first device(s) 110.

The communication environment 100 may comprise any suitable number of devices and cells. In the communication environment 100, the first device 110 and the second device 120 can communicate data and control information to each other. In the case that the first device 110 is the terminal device and the second device 120 is the network device, a link from the second device 120 to the first device 110 is referred to as a downlink (DL), while a link from the first device 110 to the second device 120 is referred to as an uplink (UL). The second device 120 and the first device 110 are interchangeable.

It is to be understood that the number of first devices and cells and their connections shown in FIG. 1 is given for the purpose of illustration without suggesting any limitations. The communication environment 100 may include any suitable number of devices and networks adapted for implementing embodiments of the present disclosure.

Communications in the communication environment 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFTs-OFDM) and/or any other technologies currently known or to be developed in the future.

Figure 2:
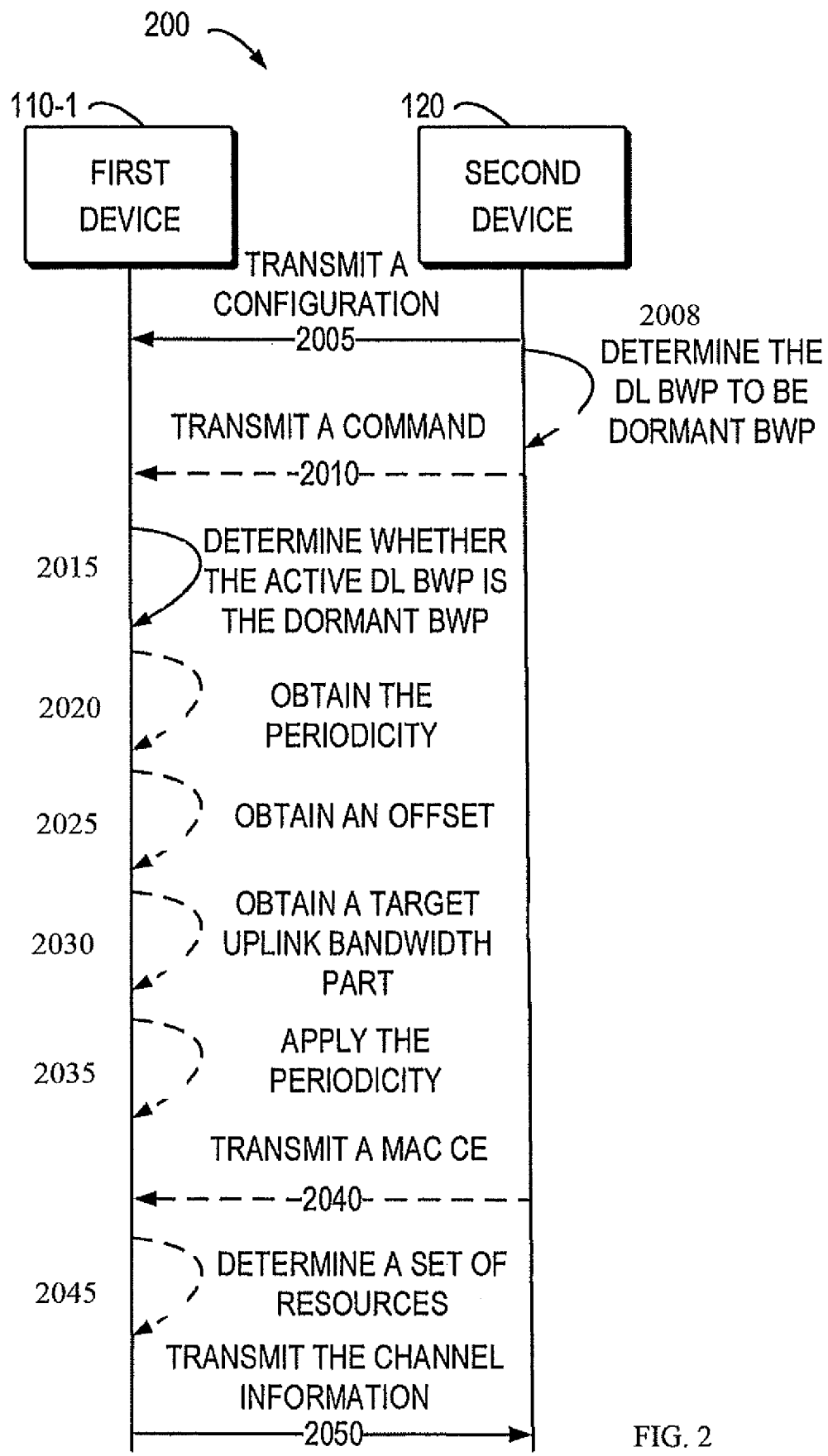
FIG. 2 illustrates a signaling flow for channel information reporting for dormant bandwidth part according to some example embodiments of the present disclosure.

Example embodiments of the present disclosure will be described in detail below with reference to the accompanying drawings. Reference is now made to FIG. 2, which illustrates a signaling flow 200 for channel information reporting for dormant bandwidth part according to some example embodiments of the present disclosure. For the purpose of discussion, the signaling flow 200 will be described with reference to FIG. 1. The signaling flow 200 may involve the first device 110-1 and the second device 120.

The second device 120 transmits 2005 a configuration for transmitting channel information. The channel information may a CSI report. Alternatively or in addition, the channel information may be an uplink reference signal. For example, the uplink reference signal may be a SRS signal. It should be noted that the channel information may be other suitable information/signal. In some example embodiments, the configuration may be transmitted together with initial configurations of UL BWP.

The configuration indicates a periodicity for transmitting the channel information when an active DL BWP for a serving cell is the dormant BWP. In some example embodiments, the periodicity may be different from a further periodicity which is configured and used when the active downlink BWP for the serving cell is a non-dormant BWP. For example, the periodicity may be multiple of the further periodicity. By way of example, if the further periodicity is 100 ms, the periodicity may be 200 ms. It should be notice that the periodicity can be any suitable integer multiple of the further periodicity. In some example embodiments, the configuration may indicate an explicit periodicity value, for example, 200 ms. Alternatively, the configuration may indicate a multiplier. For example, if the configuration indicates 2 and the further periodicity is 100 ms, it means that the periodicity is 2 times longer than the further periodicity, i.e., 200 ms. In this way, it avoids duplicating configurations of UL BWPs.

In other example embodiments, the configuration may indicate an offset which can be used to obtain the periodicity. For example, the offset may be rounded up/down to the closest allowed periodicity value. In some example embodiments, the offset may be an explicit offset value. Alternatively or in addition, the offset may be a multiplier.

Alternatively, the configuration may indicate a target UL BWP which is for transmitting the channel information when the active DL BWP for the serving cell is the dormant BWP. In some example embodiments, the target UL BWP may be linked to one of the SRS/CSI configurations (i.e. CSI/SRS resource sets) configured for the UL BWPs of the terminal device 110-1.

The periodicity may be configured per cell group. In this situation, the periodicity may be common for all serving cells within the cell group configured with the dormant BWP. Alternatively, the periodicity may be configured per UL BWP of the serving cell. In other words, periodicities of the UL BWPs may be different when the active DL BWP in the dormant BWP. Thus, only if corresponding UL BWP is active, SRS transmissions occurs while DL is on dormant BWP (i.e., such additional periodicity might not be configured for each UL BWP). Different resource sets for transmitting the channel information may be configured with different periodicities. For example, the periodicity may be configured per resource set. In other example embodiments, the periodicity may be configured per dormant BWP. For example, different dormant DL BWPs may correspond to different periodicities of UL BWPs. Table 1 below shows that configuration of SRS periodicity is currently done via each SRS-Resource. Table 2 shows that the periodicity also contains an offset to the current periodicity.

TABLE 1

| | |
|---|---|
| SRS-Resource ::= | SEQUENCE { |
| srs-ResourceId | SRS-ResourceId, |
| nrofSRS-Ports | ENUMERATED {port1, ports2, ports4}, |
| ptrs-PortIndex | ENUMERATED {n0, n1 } |
| OPTIONAL, -- Need R | |
| transmissionComb | CHOICE { |
| n2 | SEQUENCE { |
| combOffset-n2 | INTEGER (0..1), |
| cyclicShift-n2 | INTEGER (0..7) |
| }, | |
| n4 | SEQUENCE { |
| combOffset-n4 | INTEGER (0..3), |
| cyclicShifit-n4 | INTEGER (0..11) |
| } | |
| }, | |
| resourceMapping | SEQUENCE { |
| startPosition | INTEGER (0..5), |
| nrofSymbols | ENUMERATED {n1, n2, n4}, |
| repetitionFactor | ENUMERATED {n1, n2, n4} |
| }, | |
| freqDomainPosition | INTEGER (0..67), |
| freqDomainShift | INTEGER (0..268), |
| freqHopping | SEQUENCE { |
| c-SRS | INTEGER (0..63), |
| b-SRS | INTEGER (0..3), |
| b-hop | INTEGER (0..3) |
| }, | |
| groupOrSequenceHopping | ENUMERATED { neither, groupHopping, sequenceHopping }, |
| resourceType | CHOICE { |
| aperiodic | SEQUENCE { |
| ... | |
| }, | |
| semi-persistent | SEQUENCE { |
| periodicityAndOffset-sp | SRS-PeriodicityAndOffset, |

TABLE 1-continued

```
        },
            periodic              SEQUENCE {
                periodicityAndOffset-p        SRS-PeriodicityAndOffset,
                ...
            }
        },
        sequenceId                INTEGER (0..1023),
        spatialRelationInfo                           SRS-SpatialRelationInfo
OPTIONAL, -- Need R
        ...
}
```

TABLE 2

| SRS-PeriodicityAndOffset ::= | CHOICE { |
|---|---|
| sl1 | NULL, |
| sl2 | INTEGER(0..1), |
| sl4 | INTEGER(0..3), |
| sl5 | INTEGER(0..4), |
| sl8 | INTEGER(0..7), |
| sl10 | INTEGER(0..9), |
| sl16 | INTEGER(0..15), |
| sl20 | INTEGER(0..19), |
| sl32 | INTEGER(0..31), |
| sl40 | INTEGER(0..39), |
| sl64 | INTEGER(0..63), |
| sl80 | INTEGER(0..79), |
| sl160 | INTEGER(0..159), |
| sl320 | INTEGER(0..319), |
| sl640 | INTEGER(0..639), |
| sl1280 | INTEGER(0..1279), |
| sl2560 | INTEGER(0..2559) |

The second device 120 determines 2008 the active DL BWP to be the dormant BWP. For example, if there are four DL BWPs, one of the DL BWP may be configured as the dormant BWP. By way of example, the first DL BWP may be the dormant BWP. If the active DL BWP is the first DL BWP, the active DL BWP is determined to be the dormant BWP. In some example embodiments, the network device 120 may switch to a new DL BPW and determine the new DL BPW to be the dormant BWP. For example, if the first DL BWP is pre-configured as the dormant BWP and the first DL BWP is the active DL BWP, the second device 120 may determine the active DL BWP to be the dormant BWP. In some example embodiments, the second device 120 may transmit 2010 a command or configuration to the first device 110-1 to move to the dormant UL BWP.

The first device 110-1 determines 2015 whether the active DL BWP is the dormant BWP. For example, an index of the dormant BWP may be pre-configured to the first device 110-1, the first device 110-1 may compare the index of the active DL BWP with the index of the dormant BWP to determine whether the active DL BWP is the dormant BWP. Alternatively, the first device 110-1 may receive an indication concerning that the active DL BWP is the dormant BWP.

In some example embodiments, the first device 110-1 may obtain 2020 the periodicity. In some example embodiments, if the configuration may indicate an explicit periodicity value, for example, 200 ms, the first device 110-1 may obtain the periodicity directly from the configuration. Alternatively, if the configuration may indicate a multiplier, the first device 110-1 may obtain the periodicity based on the multiplier and the further periodicity which is configured for transmitting the channel information when the active downlink BWP for the serving cell is on a non-dormant bandwidth part. For example, if the configuration indicates 2 and the further periodicity is 100 ms, it means that the periodicity is 2 times longer than the further periodicity, i.e., 200 ms. In this way, the preconfigured resources can be used in the situation of dormant BWP.

Alternatively, the first device 110-1 may obtain 2025 an offset which can be used to obtain the periodicity. For example, the offset may be rounded up/down to the closest allowed periodicity value. The first device 110-1 may determine the periodicity based on the offset and the further periodicity. In some example embodiments, the offset may be an explicit offset value. For example, if the offset indicates 100 ms and the further periodicity is 100 ms, it means that the periodicity is 200 ms. Alternatively, or in addition, the offset may be a multiplier. By way of example, if the offset indicates 2 and the further periodicity is 100 ms, it means that the periodicity is 2 times longer than the further periodicity, i.e., 200 ms.

The first device 110-1 may obtain 2030 from the configuration a target UL BWP for transmitting the channel information when the active downlink BWP for the serving cell is on a dormant bandwidth part. In some example embodiments, the target UL BWP may be linked to one of the SRS/CSI configurations (i.e. CSI/SRS resource sets) configured for the UL BWPs of the terminal device 110-1. For example, a plurality of UL BWPs may be configured and one of the UL BWP may be configured as the dormant BWP. If the current UL BWP is different from the target UL BWP, the first device 110-1 may switch from the current UL BWP to the target UL BWP, when the DL BWP is the dormant BWP. As mentioned above, the periodicity for the target UL BWP may be multiple of the further periodicity. Alternatively, the first device 110-1 may obtain an explicit periodicity value of the target UL BWP. In addition, the first device 110-1 may obtain the offset and determine the periodicity of the target UL BWP based on the offset and the further periodicity.

The first device 110-1 may apply 2035 the periodicity on the current UL BWP. For example, if the active DL BWP is the dormant BWP, the first device 110-1 may extend the periodicity of the current UL BWP, for example, extending from 100 ms to 200 ms. In this situation, the first device 110-1 may still use the current UL BWP but with a longer periodicity.

Alternatively, the first device 110-1 may apply the channel information configuration (for example, CSI configuration and/or SRS configuration) of the current UL BWP on the target UL BWP. In other embodiments, only the CSI/SRS configuration periodicity is configured separately for the target UL BWP. In yet example embodiment, the periodicity is configured using the semi-persistent SRS configuration but with the indicated periodicity overriding the original configuration.

The second device 120 may transmit 2040 a medium access control (MAC) control element (CE). The MAC CE may indicate a set of resources for transmitting the channel information when the active downlink BWP for the serving cell is the dormant BWP. Additionally, the SRS could be triggered using existing semi-persistent SRS since those can then also be triggered using the existing SP-SRS activation/deactivation MAC CE (so that it's in network control whether to activate SRS resources). For example, each BWP may be configured multiple sets of resources and the MAC CE may be used to activate/deactivate one or more sets of semi-persistent (SP) SPS resources. For example, the MAC CE may use one bit indicating this SP-SRS indication is only valid for dormant cells. FIG. 3 illustrates a schematic diagram of a MAC CE according to some example embodiments of the present disclosure. The MAC CE is identified by a MAC subheader with logical channel ID (LCID) as specified FIG. 3. It has a variable size with following fields. In this way, the resource can be controlled more flexible.

The A/D field 3010 may indicate whether to activate or deactivate indicated SP SRS resource set. The A/D field 3010 may be set to 1 to indicate activation, otherwise it indicates deactivation.

The SRS Resource Set's Cell ID field 3020 may indicate the identity of the Serving Cell, which contains activated/deactivated SP SRS Resource Set. If the C field 3050 is set to 0, this SRS Resource Set's Cell ID field 3020 also indicates the identity of the Serving Cell which contains all resources indicated by the Resource $ID_i$ fields 3090 (for example, 3090-1, ..., 3090-M, where M can be any suitable integer number). The length of the SRS Resource Set's Cell ID field 3020 is 5 bits.

The SRS Resource Set's BWP ID field 3030 may indicate a UL BWP as the codepoint of the downlink control indicator bandwidth part indicator field, which contains activated/deactivated SP SRS Resource Set. If the C field 3050 is set to 0, this SRS Resource Set's BWP ID field 3030 also indicates the identity of the BWP which contains all resources indicated by the Resource $ID_i$ fields. The length of the SRS Resource Set's BWP ID field 3030 is 2 bits.

The C field 3050 may indicate whether the octets containing Resource Serving Cell ID field(s) 3092 (for example, 3092-1, ..., 3092-M, where M can be any suitable integer number) and Resource BWP ID field(s) 3094 (for example, 3094-1, ..., 3094-M, where M can be any suitable integer number) are present. If this C field 3050 is set to 1, the octets containing Resource Serving Cell ID field(s) 3092 and Resource BWP ID field(s) 3094 are present, otherwise they are not present.

The supplementary UL (SUL) field 3060 may indicate whether the MAC CE applies to the normal UL (NUL) carrier or SUL carrier configuration. This SUL field 3060 is set to 1 to indicate that it applies to the SUL carrier configuration, and the SUL field 3060 is set to 0 to indicate that it applies to the NUL carrier configuration.

The SP SRS Resource Set ID field 3070 may indicate the SP SRS Resource Set ID identified by SRS-ResourceSetId, which is to be activated or deactivated. The length of the SP SRS Resource Set ID field 3070 is 4 bits.

The $F_0$ field 3080 (for example, 3080-1, ..., 3080-M, where M can be any suitable integer number) may indicate the type of a resource used as a spatial relationship for SRS resource within SP SRS Resource Set indicated with SP SRS Resource Set ID field 3070. $F_0$ refers to the first SRS resource within the resource set and $F_1$ to the second one and so on. The $F_i$ field 3080 is set to 1 to indicate non-zero-power (NZP) CSI-RS resource index is used, and the $F_i$ field 3080 is set to 0 to indicate either SSB index or SRS resource index is used. The length of the $F_i$ field 3080 is 1 bit. This field is only present if MAC CE is used for activation, i.e. the A/D field is set to 1.

The Resource $ID_i$ field 3090 (for example, 3090-1, ..., 3090-M, where M can be any suitable integer number) contains an identifier of the resource used for spatial relationship derivation for SRS resource i. Resource $ID_0$ refers to the first SRS resource within the resource set and Resource $ID_1$ to the second one and so on. If $F_0$ field 3080 is set to 0, and the first bit of this field 3090 is set to 1, the remainder of this field contains SSB-Index. If $F_i$ is set to 0, and the first bit of this field 3090 is set to 0, the remainder of this field contains SRS-ResourceId. The length of the Resource $ID_i$ field 3090 is 7 bits. This Resource $ID_i$ field 3090 is only present if MAC CE is used for activation, i.e. the A/D field is set to 1.

The Resource Serving Cell ID; field(s) 3092 may indicate the identity of the Serving Cell on which the resource used for spatial relationship derivation for SRS resource i is located. The length of the Resource Serving Cell $ID_i$ field(s) 3092 is 5 bits. The Resource BWP $ID_i$ 3094 may indicate a UL BWP as the codepoint of the DCI bandwidth part indicator field, on which the resource used for spatial relationship derivation for SRS resource i is located. The length of the Resource BWP $ID_i$ 3094 is 2 bits. The R field(s) 3040 (for example, 3040-1, 3040-2, 3040-3, ..., 3040-P, where P can be any suitable number) may be reserved bit(s). As shown in FIG. 3, the field 3040-2 which belongs to a reserved bit may indicate that the SP-SRS activation is for a dormant SCell UL transmission.

The first device 110-1 may determine 2045 the set of resources based on the MAC CE. For example, if this D field 3040-1 is set to 1, the first device 110-1 may determine that the SP-SRS is only activated for the dormant SCell.

The first device 110-1 transmits 2050 the channel information to the second device 120. For example, the channel information may be transmitted on the current UL BWP with the periodicity. Alternatively, the first device 110-1 may transmit the channel information on the target UL BWP.

According to embodiments of the present disclosure, it allows SRS/CSI reporting without duplicating configurations of BWPs, thereby saving signaling. It can configure a required longer periodicity but reduce the SRS configuration for each UL BWP. There is no need to reconfigure the BWP.

Figure 4:
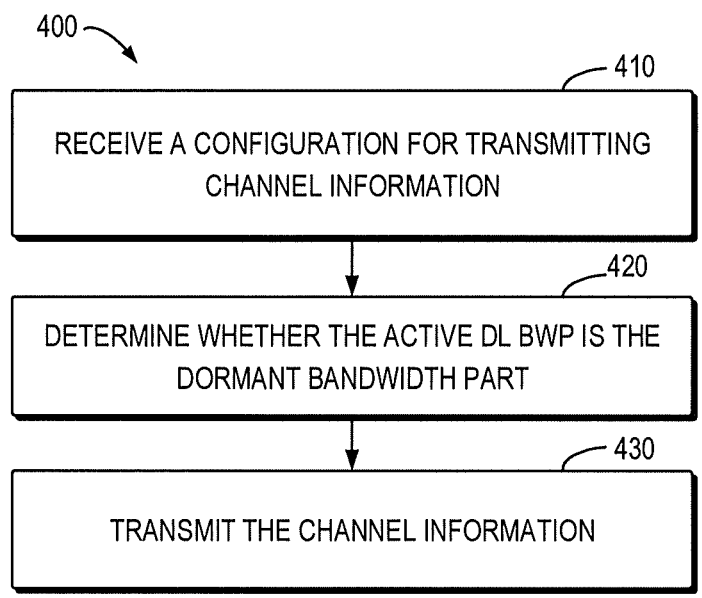
FIG. 4 illustrates a flowchart of a method implemented at a first apparatus according to some example embodiments of the present disclosure.

FIG. 4 shows a flowchart of an example method 400 implemented at a first device 110 in accordance with some example embodiments of the present disclosure. For the purpose of discussion, the method 400 will be described from the perspective of the first device 110-1.

At block 410, the first device 110-1 receives a configuration for transmitting channel information. The channel information may a CSI report. Alternatively or in addition, the channel information may be an uplink reference signal. For example, the uplink reference signal may be a SRS signal. It should be noted that the channel information may be other suitable information/signal. In some example embodiments, the configuration may be transmitted together with initial configurations of UL BWP.

The configuration indicates a periodicity for transmitting the channel information when an active DL BWP for a serving cell is the dormant BWP. In some example embodiments, the periodicity may be no shorter than a further periodicity which is configured and used when the active downlink BWP for the serving cell is a non-dormant BWP. For example, the periodicity may be multiple of the further periodicity. By way of example, if the further periodicity is 100 ms, the periodicity may be 200 ms. It should be notice that the periodicity can be any suitable integer multiple of the further periodicity. In some example embodiments, the configuration may indicate an explicit periodicity value, for example, 200 ms. Alternatively, the configuration may indicate a multiplier. For example, if the configuration indicates 2 and the further periodicity is 100 ms, it means that the periodicity is 2 times longer than the further periodicity, i.e., 200 ms. In this way, it avoids duplicating configurations of UL BWPs.

In other example embodiments, the configuration may indicate an offset which can be used to obtain the periodicity. For example, the offset may be rounded up/down to the closest allowed periodicity value. In some example embodiments, the offset may be an explicit offset value. Alternatively or in addition, the offset may be a multiplier.

Alternatively, the configuration may indicate a target UL BWP which is for transmitting the channel information when the active DL BWP for the serving cell is the dormant BWP. In some example embodiments, the target UL BWP may be linked to one of the SRS/CSI configurations (i.e. CSI/SRS resource sets) configured for the UL BWPs of the terminal device 110-1.

The periodicity may be configured per cell group. In this situation, the periodicity may be common for all serving cells within the cell group configured with the dormant BWP. Alternatively, the periodicity may be configured per UL BWP of the serving cell. In other words, periodicities of the UL BWPs may be different when the active DL BWP in the dormant BWP. Thus, only if corresponding UL BWP is active, SRS transmissions occurs while DL is on dormant BWP (i.e., such additional periodicity might not be configured for each UL BWP). Different resource sets for transmitting the channel information may be configured with different periodicities. For example, the periodicity may be configured per resource set. In other example embodiments, the periodicity may be configured per dormant BWP. For example, different dormant DL BWPs may correspond to different periodicities of UL BWPs.

At block 420, the first device 110-1 determines whether active DL BWP is the dormant BWP. For example, an index of the dormant BWP may be pre-configured to the first device 110-1, the first device 110-1 may compare the index of the active DL BWP with the index of the dormant BWP to determine whether the active DL BWP is the dormant BWP. Alternatively, the first device 110-1 may receive an indication concerning that the active DL BWP is the dormant BWP.

In some example embodiments, the first device 110-1 may obtain the periodicity. In some example embodiments, if the configuration may indicate an explicit periodicity value, for example, 200 ms, the first device 110-1 may obtain the periodicity directly from the configuration. Alternatively, if the configuration may indicate a multiplier, the first device 110-1 may obtain the periodicity based on the multiplier and the further periodicity which is configured for transmitting the channel information when the active downlink BWP for the serving cell is on a non-dormant bandwidth part. For example, if the configuration indicates 2 and the further periodicity is 100 ms, it means that the periodicity is 2 times longer than the further periodicity, i.e., 200 ms. In this way, the preconfigured resources can be used in the situation of dormant BWP.

Alternatively, the first device 110-1 may obtain an offset which can be used to obtain the periodicity. For example, the offset may be rounded up/down to the closest allowed periodicity value. The first device 110-1 may determine the periodicity based on the offset and the further periodicity. In some example embodiments, the offset may be an explicit offset value. For example, if the offset indicates 100 ms and the further periodicity is 100 ms, it means that the periodicity is 200 ms. Alternatively or in addition, the offset may be a multiplier. By way of example, if the offset indicates 2 and the further periodicity is 100 ms, it means that the periodicity is 2 times longer than the further periodicity, i.e., 200 ms.

The first device 110-1 may obtain from the configuration a target UL BWP for transmitting the channel information when the active downlink BWP for the serving cell is on a dormant bandwidth part. In some example embodiments, the target UL BWP may be linked to one of the SRS/CSI configurations (i.e. CSI/SRS resource sets) configured for the UL BWPs of the terminal device 110-1. For example, a plurality of UL BWPs may be configured and one of the UL BWP may be configured as the dormant BWP. If the current UL BWP is different from the target UL BWP, the first device 110-1 may switch from the current UL BWP to the target UL BWP, when the DL BWP is the dormant BWP. As mentioned above, the periodicity for the target UL BWP may be multiple of the further periodicity. Alternatively, the first device 110-1 may obtain an explicit periodicity value of the target UL BWP. In addition, the first device 110-1 may obtain the offset and determine the periodicity of the target UL BWP based on the offset and the further periodicity.

The first device 110-1 may apply the periodicity on the current UL BWP. For example, if the active DL BWP is the dormant BWP, the first device 110-1 may extend the periodicity of the current UL BWP, for example, extending from 100 ms to 200 ms. In this situation, the first device 110-1 may still use the current UL BWP but with a longer periodicity.

Alternatively, the first device 110-1 may apply the CSI/SRS configuration of the current UL BWP on the target UL BWP. In other embodiments, only the CSI/SRS configuration periodicity is configured separately for the target UL BWP. In yet example embodiment, the periodicity is configured using the semi-persistent SRS configuration but with the indicated periodicity overriding the original configuration.

In some example embodiments, the first device 110-1 may receive a MAC CE from the second device 120. The MAC CE may indicate a set of resources for transmitting the channel information when the active downlink BWP for the serving cell is the dormant BWP. Additionally, the SRS could be triggered using existing semi-persistent SRS since those can then also be triggered using the existing SP-SRS activation/deactivation MAC CE (so that it's in network control whether to activate SRS resources). For example, each BWP may be configured multiple sets of resources and the MAC CE may be used to activate/deactivate one or more sets of semi persistent (SP) SPS resources. For example, the MAC CE may use one bit indicating the this SP-SRS indication is only valid for dormant cells. The first device 110-1 may determine the set of resources based on the MAC CE. For example, if this D field 3040-1 is set to 1, the first device 110-1 may determine that the SP-SRS is only activated for the dormant SCell.

At block 430, the first device 110-1 transmits 2050 the channel information to the second device 120. For example, the channel information may be transmitted on the current UL BWP with the periodicity. Alternatively, the first device 110-1 may transmit the channel information on the target UL BWP.

According to embodiments of the present disclosure, it avoids duplicating configurations of BWPs, thereby saving signaling. It can configure a required longer periodicity but reduce the SRS configuration for each UL BWP. It may also save resources since it does not need reconfigurations.

Figure 5:
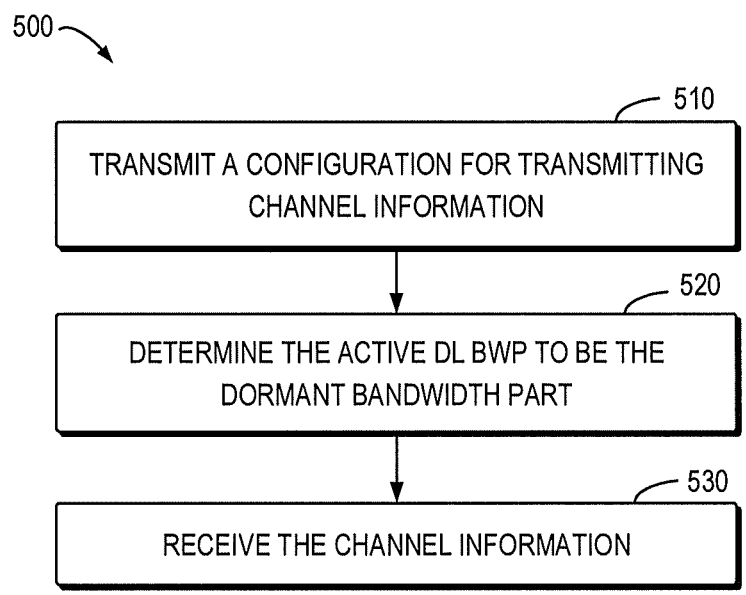
FIG. 5 illustrates a flowchart of a method implemented at a second apparatus according to some other example embodiments of the present disclosure.

FIG. 5 shows a flowchart of an example method 500 implemented at a second device 120 in accordance with some example embodiments of the present disclosure. For the purpose of discussion, the method 500 will be described from the perspective of the second device 120.

At block 510, the second device 120 transmits a configuration for transmitting channel information. The channel information may a CSI report. Alternatively, or in addition, the channel information may be an uplink reference signal. For example, the uplink reference signal may be a SRS signal. It should be noted that the channel information may be other suitable information/signal. In some example embodiments, the configuration may be transmitted together with initial configurations of UL BWP.

The configuration indicates a periodicity for transmitting the channel information when an active DL BWP for a serving cell is the dormant BWP. In some example embodiments, the periodicity may be no shorter than a further periodicity which is configured and used when the active downlink BWP for the serving cell is a non-dormant BWP. For example, the periodicity may be multiple of the further periodicity. By way of example, if the further periodicity is 100 ms, the periodicity may be 200 ms. It should be notice that the periodicity can be any suitable integer multiple of the further periodicity. In some example embodiments, the configuration may indicate an explicit periodicity value, for example, 200 ms. Alternatively, the configuration may indicate a multiplier. For example, if the configuration indicates 2 and the further periodicity is 100 ms, it means that the periodicity is 2 times longer than the further periodicity, i.e., 200 ms. In this way, it avoids duplicating configurations of UL BWPs.

In other example embodiments, the configuration may indicate an offset which can be used to obtain the periodicity. For example, the offset may be rounded up/down to the closest allowed periodicity value. In some example embodiments, the offset may be an explicit offset value. Alternatively or in addition, the offset may be a multiplier.

Alternatively, the configuration may indicate a target UL BWP which is for transmitting the channel information when the active DL BWP for the serving cell is the dormant BWP. In some example embodiments, the target UL BWP may be linked to one of the SRS/CSI configurations (i.e. CSI/SRS resource sets) configured for the UL BWPs of the terminal device 110-1.

The periodicity may be configured per cell group. In this situation, the periodicity may be common for all serving cells within the cell group configured with the dormant BWP. Alternatively, the periodicity may be configured per UL BWP of the serving cell. In other words, periodicities of the UL BWPs may be different when the active DL BWP in the dormant BWP. Thus, only if corresponding UL BWP is active, SRS transmissions occurs while DL is on dormant BWP (i.e., such additional periodicity might not be configured for each UL BWP). Different resource sets for transmitting the channel information may be configured with different periodicities. For example, the periodicity may be configured per resource set. In other example embodiments, the periodicity may be configured per dormant BWP. For example, different dormant DL BWPs may correspond to different periodicities of UL BWPs.

At block 520, the second device 120 determines the active DL BWP to be the dormant BWP. For example, if there are four DL BWPs, one of the DL BWP may be configured as the dormant BWP. By way of example, the first DL BWP may be the dormant BWP. If the active DL BWP is the first DL BWP, the active DL BWP is determined to be the dormant BWP. In some example embodiments, the network device 120 may switch to a new DL BPW and determine the new DL BPW to be the dormant BWP. For example, if the first DL BWP is pre-configured as the dormant BWP and the first DL BWP is the active DL BWP, the second device 120 may determine the active DL BWP to be the dormant BWP. In some example embodiments, the second device 120 may transmit a command or configuration to the first device 110-1 to move to the dormant UL BWP.

At block 530, the second device 120 receives the channel information from the first device 110-1. For example, the channel information may be transmitted on the current UL BWP with the periodicity. Alternatively, the second device 120 may receive the channel information on the target UL BWP.

In some example embodiments, a first apparatus capable of performing any of the method 400 (for example, the first device 110) may comprise means for performing the respective operations of the method 400. The means may be implemented in any suitable form. For example, the means may be implemented in a circuitry or software module. The first apparatus may be implemented as or included in the first device 110. In some example embodiments, the means may comprise at least one processor and at least one memory including computer program code. The at least one memory and computer program code are configured to, with the at least one processor, cause performance of the apparatus.

In some example embodiments, the apparatus comprises means for receiving, at a first device and from a second device, a configuration for transmitting channel information, the configuration indicating a periodicity for transmitting the channel information when an active downlink bandwidth part (BWP) for a serving cell is a dormant bandwidth part; means for determining whether the active downlink BWP for the serving cell is the dormant bandwidth part; and means for in accordance with a determination that the active downlink BWP is the dormant bandwidth part, transmitting the channel information to the second device with the periodicity.

In some example embodiments, the periodicity is different from a further periodicity which is configured and used when the active downlink BWP for the serving cell is not a dormant BWP.

In some example embodiments, the periodicity is multiple of a further periodicity which is configured and used when the active downlink BWP for the serving cell is not a dormant BWP.

In some example embodiments, the channel information is at least one of an uplink reference signal or a channel state information report.

In some example embodiments, the periodicity is configured in at least one of the followings: per cell group which is common for all serving cells within the cell group configured with dormant BWP, per serving cell, per uplink bandwidth part of a serving cell, per resource set for transmitting the channel information, or per dormant bandwidth part.

In some example embodiments, the means for transmitting the channel information to the second device comprises: means for obtaining from the configuration the periodicity; means for applying the periodicity on a current uplink bandwidth part; and means for transmitting the channel information on the current uplink bandwidth part.

In some example embodiments, the means for transmitting the channel information to the second device comprises: means for obtaining from the configuration an offset; means for determining the periodicity based on the offset and a further periodicity which is configured for transmitting the channel information when the active downlink BWP for the serving cell is on a non-dormant bandwidth part; means for applying the periodicity on a current uplink bandwidth part; and means for transmitting the channel information on the current uplink bandwidth part.

In some example embodiments, the offset comprises at least one of a multiplier or an explicit offset value.

In some example embodiments, the means for transmitting the channel information to the second device comprises: means for obtaining from the configuration a target uplink bandwidth part for transmitting the channel information when the active downlink BWP for the serving cell is the dormant bandwidth part; means for in accordance with a determination that a current uplink bandwidth part is different from the target uplink bandwidth part, switching from the current uplink bandwidth part to the target uplink bandwidth part; means for applying channel information configuration of the current uplink bandwidth part on the target uplink bandwidth part; and/or means for applying the periodicity on target uplink bandwidth part; and means for transmitting the channel information on the target uplink bandwidth part.

In some example embodiments, the means for transmitting the channel information to the second device comprises: means for receiving from the second device a medium access control, MAC, control element, CE, indicating a set of resources for transmitting the channel information when the active downlink BWP for the serving cell is the dormant bandwidth part; and means for transmitting the channel information to the second device using the set of resources.

In some example embodiments, the first device comprises a terminal device and the second device comprises a network device.

In some example embodiments, a second apparatus capable of performing any of the method 500 (for example, the second device 120) may comprise means for performing the respective operations of the method 500. The means may be implemented in any suitable form. For example, the means may be implemented in a circuitry or software module. In some example embodiments, the means may comprise at least one processor and at least one memory including computer program code. The at least one memory and computer program code are configured to, with the at least one processor, cause performance of the apparatus. The second apparatus may be implemented as or included in the second device 120.

In some example embodiments, the apparatus comprises means for transmitting, at a second device and to a first device, a configuration for transmitting channel information, the configuration indicating a periodicity for transmitting the channel information when an active downlink bandwidth part (BWP) for a serving cell is a dormant bandwidth part; means for determining the active downlink BWP for the serving cell is the dormant bandwidth part; and means for receiving the channel information to the second device with the periodicity.

In some example embodiments, the periodicity is different from a further periodicity which is configured and used when the active downlink BWP for the serving cell is not a dormant BWP.

In some example embodiments, the periodicity is multiple of a further periodicity which is configured and used when the active downlink BWP for the serving cell is not a dormant BWP.

In some example embodiments, the channel information is at least one of an uplink reference signal or a channel state information report.

In some example embodiments, the periodicity is configured in at least one of the following: per cell group which is common for all serving cells within the cell group configured with dormant BWP, per serving cell, per uplink bandwidth part of a serving cell, per resource set for transmitting the channel information, or per dormant bandwidth part.

In some example embodiments, the means for transmitting the configuration comprises means for transmitting the configuration indicating an explicit periodicity.

In some example embodiments, the means for transmitting the configuration comprises means for transmitting the configuration indicating an offset to a further periodicity which is configured for transmitting the channel information when the downlink used by the second device is on a non-dormant bandwidth part, the periodicity being determined based on the offset and the further periodicity.

In some example embodiments, the offset comprises at least one of a multiplier or an explicit offset value.

In some example embodiments, the means for transmitting the configuration comprises means for transmitting the configuration indicating a target uplink bandwidth part for transmitting the channel information when the downlink used by the second device is on a dormant bandwidth part.

In some example embodiments, the apparatus further comprise means for transmitting to the first device a medium access control, MAC, control element, CE, indicating a set of resources for transmitting the channel information when the active downlink BWP for the serving cell is the dormant bandwidth part.

In some example embodiments, the first device comprises a terminal device and the second device comprises a network device.

Figure 6:
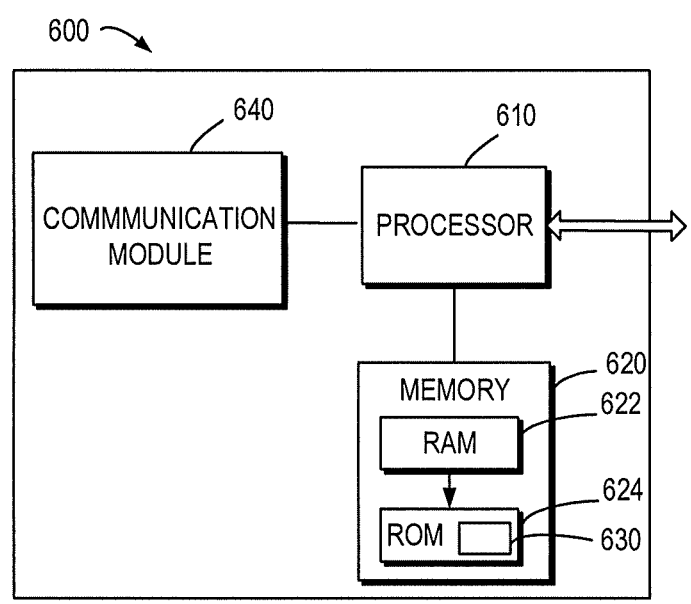
FIG. 6 illustrates a simplified block diagram of an apparatus that is suitable for implementing example embodiments of the present disclosure.

FIG. 6 is a simplified block diagram of a device 600 that is suitable for implementing example embodiments of the present disclosure. The device 600 may be provided to implement a communication device, for example, the first device 110 or the second device 120 as shown in FIG. 1. As shown, the device 600 includes one or more processors 610, one or more memories 620 coupled to the processor 610, and one or more communication modules 640 coupled to the processor 610.

The communication module 640 is for bidirectional communications. The communication module 640 has one or more communication interfaces to facilitate communication with one or more other modules or devices. The communication interfaces may represent any interface that is necessary for communication with other network elements. In some example embodiments, the communication module 640 may include at least one antenna.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The program 630 may be stored in the memory, e.g., ROM 624. The processor 610 may perform any suitable actions and processing by loading the program 630 into the RAM 622.

Example embodiments of the present disclosure may be implemented by means of the program 630 so that the device 600 may perform any process of the disclosure as discussed with reference to FIGS. 2 to 5. The example embodiments of the present disclosure may also be implemented by hardware or by a combination of software and hardware.

Figure 7:
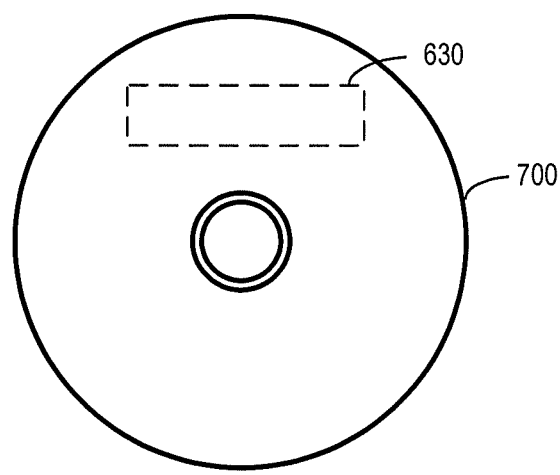
FIG. 7 illustrates a block diagram of an example computer readable medium in accordance with some example embodiments of the present disclosure.

In some example embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. The computer readable medium may include any types of tangible non-volatile storage, such as ROM, EPROM, a flash memory, a hard disk, CD, DVD, and other magnetic storage and/or optical storage. FIG. 7 shows an example of the computer readable medium 700 in form of an optical storage disk. The computer readable medium has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target physical or virtual processor, to carry out any of the methods as described above with reference to FIGS. 3 to 8. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
   at least one processor; and
   at least one non-transitory memory storing instructions, that when executed by the at least one processor, cause the first device to:
   receive, from a second device, a configuration for transmitting channel information, the configuration indicating a periodicity for transmitting the channel information when an active downlink bandwidth part for a serving cell is a dormant bandwidth part,
wherein the configuration is indicating at least one of activation or deactivation of one or more sets of resources including semi-persistent resources for the dormant bandwidth part for transmitting the channel information,
wherein the channel information comprises a channel state information report, and
wherein the periodicity is configured per serving cell;
determine whether the active downlink bandwidth part for the serving cell is the dormant bandwidth part; and
in accordance with a determination that the active downlink bandwidth part is the dormant bandwidth part, transmit the channel information to the second device with the periodicity.

2. The first device of claim 1, wherein the periodicity is different from a further periodicity which is configured and used when the active downlink bandwidth part for the serving cell is not a dormant bandwidth part.

3. The first device of claim 1, wherein the periodicity is multiple of a further periodicity which is configured and used when the active downlink bandwidth part for the serving cell is not a dormant bandwidth part.

4. The first device of claim 1, wherein the channel information comprises an uplink reference signal.

5. The first device of claim 1, wherein the periodicity is configured in at least one of the followings:
per cell group which is common for all serving cells within the cell group configured with dormant bandwidth part,
per uplink bandwidth part of a serving cell,
per resource set for transmitting the channel information, or
per dormant bandwidth part.

6. The first device of claim 1, wherein the at least one memory storing instructions is executed by the at least one processor, to cause the first device to transmit the channel information to the second device by:
obtaining from the configuration the periodicity;
applying the periodicity on a current uplink bandwidth part; and
transmitting the channel information on the current uplink bandwidth part.

7. The first device of claim 1, wherein the first device is caused to transmit the channel information to the second device by:
obtaining from the configuration an offset;
determining the periodicity based on the offset and a further periodicity which is configured for transmitting the channel information when the active downlink bandwidth part for the serving cell is on a non-dormant bandwidth part;
applying the periodicity on a current uplink bandwidth part; and
transmitting the channel information on the current uplink bandwidth part.

8. The first device of claim 7, wherein the offset comprises at least one of a multiplier or-an explicit offset value.

9. The first device of claim 1, wherein the at least one memory storing instructions is executed by the at least one processor, to cause the first device to transmit the channel information to the second device by:
obtaining from the configuration a target uplink bandwidth part for transmitting the channel information when the active downlink bandwidth part for the serving cell is the dormant bandwidth part;
in accordance with a determination that a current uplink bandwidth part is different from the target uplink bandwidth part, switching from the current uplink bandwidth part to the target uplink bandwidth part;
applying channel information configuration of the current uplink bandwidth part on the target uplink bandwidth part; and/or
applying the periodicity on target uplink bandwidth part; and
transmitting the channel information on the target uplink bandwidth part.

10. The first device of claim 1, wherein the at least one memory storing instructions is executed by the at least one processor, to cause the first device to transmit the channel information to the second device by:
receiving from the second device a medium access control, MAC, control element indicating a set of resources for transmitting the channel information when the active downlink bandwidth part for the serving cell is the dormant bandwidth part; and
transmitting the channel information to the second device using the set of resources.

11. The first device of claim 1, wherein the first device comprises a terminal device and the second device comprises a network device.

12. A second device comprising:
at least one processor; and
at least one non-transitory memory including computer program code;
the at least one memory and the computer program code are configured to, with the at least one processor, cause the second device to:
transmit to a first device a configuration for transmitting channel information, the configuration indicating a periodicity for transmitting the channel information when an active downlink bandwidth part for a serving cell is a dormant bandwidth part,
wherein the configuration is indicating at least one of activation or deactivation of one or more sets of resources including semi-persistent resources for the dormant bandwidth part for transmitting the channel information,
wherein the channel information comprises a channel state information report, and
wherein the periodicity is configured per serving cell;
determine the active downlink bandwidth part for the serving cell is the dormant bandwidth part; and
receive the channel information to the second device with the periodicity.

13. The second device of claim 12, wherein the periodicity is different from a further periodicity which is configured and used when the active downlink bandwidth part for the serving cell is not a dormant bandwidth part.

14. The second device of claim 12, wherein the periodicity is multiple of a further periodicity which is configured and used when the active downlink bandwidth part for the serving cell is not a dormant bandwidth part.

15. The second device of claim 12, wherein the channel information comprises an uplink reference signal.

16. The second device of claim 12, wherein the periodicity is configured in at least one of the following:
per cell group which is common for all serving cells within the cell group configured with dormant bandwidth part,
per uplink bandwidth part of a serving cell, per resource set for transmitting the channel information, or per dormant bandwidth part.

17. The second device of claim 12, wherein the at least one memory and the computer program codes are configured, with the at least one processor, cause the first device to transmit the configuration by:

transmitting the configuration indicating an explicit periodicity.

18. The second device of claim 12, wherein the at least one memory and the computer program codes are configured, with the at least one processor, cause the first device to transmit the configuration by:

transmitting the configuration indicating an offset to a further periodicity which is configured for transmitting the channel information when the downlink used by the second device is on a non-dormant bandwidth part, the periodicity being determined based on the offset and the further periodicity.

19. The second device of claim 18, wherein the offset comprises at least one of a multiplier or an explicit offset value.

20. The second device of claim 12, wherein the at least one memory and the computer program codes are configured, with the at least one processor, cause the first device to transmit the configuration by:

transmitting the configuration indicating a target uplink bandwidth part for transmitting the channel information when the downlink used by the second device is on a dormant bandwidth part.

21. The second device of claim 12, wherein least one memory and the computer program codes are configured, with the at least one processor, cause the first device to:

transmit to the first device a medium access control, control element indicating a set of resources for transmitting the channel information when the active downlink bandwidth part for the serving cell is the dormant bandwidth part.

22. The second device of claim 12, wherein the first device comprises a terminal device and the second device comprises a network device.

\* \* \* \* \*